(12) United States Patent
Cherian et al.

(10) Patent No.: US 8,831,568 B2
(45) Date of Patent: Sep. 9, 2014

(54) AUTOMATIC CONFIGURATION OF A WIRELESS DEVICE

(75) Inventors: George Cherian, San Diego, CA (US); Mahesh D. Iyer, Saratoga, CA (US); Santosh Paul Abraham, San Diego, CA (US); Philip Michael Hawkes, Warrimoo (AU)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/589,623

(22) Filed: Aug. 20, 2012

(65) Prior Publication Data

US 2013/0217359 A1 Aug. 22, 2013

Related U.S. Application Data

(60) Provisional application No. 61/539,817, filed on Sep. 27, 2011, provisional application No. 61/616,960, filed on Mar. 28, 2012.

(51) Int. Cl.
| | |
|---|---|
| *H04M 1/66* | (2006.01) |
| *G06F 15/177* | (2006.01) |
| *H04L 29/06* | (2006.01) |
| *G06F 21/44* | (2013.01) |
| *H04W 48/16* | (2009.01) |
| *H04W 12/04* | (2009.01) |
| *H04L 12/24* | (2006.01) |

(52) U.S. Cl.
CPC ............. *H04W 48/16* (2013.01); *G06F 15/177* (2013.01); *H04L 65/1066* (2013.01); *G06F 21/44* (2013.01); *H04L 12/2424* (2013.01); *H04L 63/062* (2013.01); *H04W 12/04* (2013.01); *H04L 63/18* (2013.01); *H04L 41/0886* (2013.01)

USPC .......... 455/411; 455/410; 455/418; 455/41.2; 370/338

(58) Field of Classification Search
USPC .......... 455/410–411, 418–420, 41.2; 370/338
See application file for complete search history.

(56) References Cited

U.S. PATENT DOCUMENTS 5,673,317 A * 9/1997 Cooper .......................... 380/249
5,964,877 A * 10/1999 Victor et al. .................... 726/18

(Continued)

FOREIGN PATENT DOCUMENTS

| DE | 102010010760 A1 | 9/2011 |
|---|---|---|
| EP | 1739880 A1 | 1/2007 |
| EP | 1748669 A1 | 1/2007 |

OTHER PUBLICATIONS

3rd Generation Partnership Project; Technical Specification Group Services and System Aspects; Feasibility study on the security aspects, of remote provisioning and change of subscription for Machine to Machine (M2M) equipment (Release 9 ) , 3GPP Standard; 3GPP TR 33.812, 3rd Generation Partnership Project (3GPP), Mobile Competence Centre ; 650, Route Des Lucioles.;. F-06921 Sophia-Antipolis Cedex- ; France, No. V9.2.0, Jun. 22, 2010, pp. 1-87, XP050441986, [retrieved-on Jun. 22, 2010].

(Continued)

*Primary Examiner* — Sharad Rampuria
(74) *Attorney, Agent, or Firm* — S. Hossain Beladi

(57) ABSTRACT

A method of automatically configuring a wireless device includes receiving programming credentials from a server at a programming module and authenticating the wireless device based on the programming credentials. The method includes programming the wireless device with access credentials of an access point of a network to enable the wireless device to communicate, via the access point, with one or more devices outside of the network.

65 Claims, 7 Drawing Sheets

(56) References Cited

U.S. PATENT DOCUMENTS

| | | | |
|---|---|---|---|
| 7,616,594 B2 | 11/2009 | Roberts et al. | |
| 8,036,639 B2* | 10/2011 | Carter et al. | 455/411 |
| 8,041,035 B2 | 10/2011 | Miller | |
| 8,050,229 B2* | 11/2011 | Miao et al. | 370/331 |
| 8,195,140 B2* | 6/2012 | Knezevic | 455/418 |
| 8,381,268 B2* | 2/2013 | Winget et al. | 726/4 |
| 8,457,797 B2* | 6/2013 | Imes et al. | 700/276 |
| 8,472,935 B1* | 6/2013 | Fujisaki | 455/418 |
| 8,670,755 B2* | 3/2014 | Knezevic | 455/419 |
| 2005/0054329 A1 | 3/2005 | Kokudo | |
| 2005/0270989 A1 | 12/2005 | Park et al. | |
| 2007/0079113 A1 | 4/2007 | Kulkarni et al. | |
| 2007/0101136 A1 | 5/2007 | Lai et al. | |
| 2009/0093232 A1* | 4/2009 | Gupta et al. | 455/410 |
| 2009/0205028 A1 | 8/2009 | Smeets et al. | |
| 2010/0082988 A1 | 4/2010 | Huebner et al. | |
| 2010/0304716 A1 | 12/2010 | Hoeksel et al. | |
| 2011/0040862 A1 | 2/2011 | Nakajima | |
| 2011/0072101 A1 | 3/2011 | Forssell et al. | |
| 2011/0110521 A1 | 5/2011 | Yang et al. | |
| 2011/0149930 A1 | 6/2011 | Sakai | |
| 2011/0237224 A1* | 9/2011 | Coppinger | 455/411 |
| 2011/0238844 A1 | 9/2011 | Lu et al. | |
| 2011/0271110 A1 | 11/2011 | Ohba et al. | |
| 2011/0280227 A1* | 11/2011 | McCann et al. | 370/338 |
| 2012/0044865 A1 | 2/2012 | Singh et al. | |
| 2012/0047551 A1 | 2/2012 | Pattar et al. | |
| 2012/0100803 A1 | 4/2012 | Suumaki et al. | |
| 2012/0106449 A1 | 5/2012 | Shibuya | |
| 2013/0081113 A1 | 3/2013 | Cherian et al. | |
| 2013/0242951 A1 | 9/2013 | Lee et al. | |
| 2013/0286889 A1 | 10/2013 | Cherian et al. | |
| 2013/0308490 A1 | 11/2013 | Lim et al. | |
| 2014/0023053 A1 | 1/2014 | Park et al. | |

OTHER PUBLICATIONS

International Search Report and Written Opinion—PCT/US2012/051894—ISA/EPO—Dec. 6, 2012.

"Wi-Fi Protected Setup Specification Version 1.oh", Dec. 31, 2006, pp. 1-110, XP55031152, Internet Retrieved from the Internet: URL:http://gpl.back2roots.org/source/puma5 /netgear/CG3200-1TDNDS_GPL/ap/apps/wpa2/original/Wi-Fi Protected Setup Specification1. Oh.pdf [retrieved on Jun. 26, 2006].

Ohba, Y., et al., "Extensible Authentication Protocol (EAP) Early Authentication Problem Statement; rfc5836.txt", Internet Engineering Task Force, IETF; Standard, Internet Society (ISOC) 4, Rue Des Falaises CH-1205 Geneva, Switzerland, Apr. 27, 2010, pp. 1-20, XP015070773.

* cited by examiner

AUTOMATIC CONFIGURATION OF A WIRELESS DEVICE

I. CROSS-REFERENCE TO RELATED APPLICATIONS

The present application claims priority from commonly owned U.S. Provisional Patent Application 61/539,817 filed Sep. 27, 2011 and titled METHODS OF AND SYSTEMS FOR REMOTELY CONFIGURING A WIRELESS DEVICE, the content of which is expressly incorporated herein by reference in its entirety. The present application claims priority from commonly owned U.S. Provisional Patent Application 61/616,960 filed Mar. 28, 2012 and titled AUTOMATIC CONFIGURATION OF A WIRELESS DEVICE, the content of which is expressly incorporated herein by reference in its entirety.

II. FIELD

The present disclosure is generally related to configuration of a wireless device to communicate via an access point.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Also, such wireless telephones can process executable instructions, including software applications, such as a web browser application, that can be used to access the Internet. As such, these wireless telephones can include significant computing capabilities.

Some devices may be configured to communicate data via an access point of a wireless network. For example, many devices are configured to operate according to an Institute of Electrical and Electronics Engineers (IEEE) 802.11 standard that enables wireless exchange of data via the access point of the wireless network. To illustrate, a wireless device may communicate via the access point that is compliant with one or more versions of the IEEE 802.11 standard. The wireless device may need to be configured to be able to communicate via the access point. The wireless device may be configured to communicate via the access point by authenticating the wireless device based on programming credentials and by programming the wireless device with the access credentials of the access point. Authenticating the wireless device based on the programming credentials may unlock the wireless device to enable programming with the access credentials. Typically, a user has to enter a password, such as a four digit code, to unlock the device. The user may also need to enter access credentials, such as a service set identifier (SSID) of the access point (e.g., an SSID of a router) and a passphrase to enable the wireless device to communicate with other devices (e.g., a server) via the access point. However, some wireless devices may not be equipped with data entry and display mechanisms complicating the configuration of the wireless device to communicate via the access point.

IV. SUMMARY

A system and methods of automatically configuring a wireless device to communicate via an access point of a network are disclosed. A programming module may automatically configure a wireless device to communicate via the access point of the network with other devices in the network and with devices outside of the network. To illustrate, the programming module may automatically configure the wireless device by authenticating and programming the wireless device. For example, the programming module may authenticate the wireless device based on programming credentials to unlock the device. After unlocking the wireless device, the programming module may program the wireless device with access credentials of the access point to enable the wireless device to communicate via the access point.

The programming module may reside within the network. For example, the programming module may operate as a gateway device between the access point of the network and other networks (e.g., the internet) and may communicate through the access point to automatically configure the wireless device. Alternatively, the programming module and the access point may be integrated into a single device such that the integrated device operates both as the access point of the network and as the programming module. Alternatively, the programming module may be located outside of the network and may communicate directly with the wireless device to automatically configure the wireless device to communicate via the access point of the network.

In a particular embodiment, a method of automatically configuring a wireless device includes receiving programming credentials at a programming module and authenticating the wireless device based on the programming credentials. The method includes programming the wireless device with access credentials of an access point of a network to enable the wireless device to communicate, via the access point, with devices outside of the network.

In a particular embodiment, an apparatus for automatically configuring a wireless device includes a processor and a memory storing instructions executable by the processor. The instructions are executable by the processor to detect receipt of programming credentials and to authenticate the wireless device based on the programming credentials. The instructions are further executable by the processor to program the wireless device with access credentials of an access point of a network to enable the wireless device to communicate, via the access point, with devices outside of the network.

In a particular embodiment, a method of automatically configuring a wireless device includes performing service discovery by the wireless device to identify a programming module. The method further includes sending to the programming module a probe request including a first device public key. The method also includes receiving from the programming module a probe response including an indication of a match between the first device public key and a second device public key.

In a particular embodiment, an apparatus for automatically configuring a wireless device includes a processor and a memory storing instructions executable by the processor. The instructions are executable by the processor to perform service discovery by the wireless device to identify a programming module. The instructions are further executable by the processor to initiate sending to the programming module a probe request including a first device public key. The instructions are also executable by the processor to detect receipt of a probe response from the programming module that includes an indication of a match between the first device public key and a second device public key.

In a particular embodiment, a method includes receiving, at a server, device information of a wireless device and subscription information of a subscriber. The method includes providing programming credentials to a programming module based on both the device information and the subscription information. The programming credentials are used to authenticate the wireless device to enable programming of the wireless device with access credentials of an access point of a network.

In a particular embodiment, an apparatus includes a processor and a memory storing instructions executable by the processor. The instructions are executable by the processor to detect receipt of device information of a wireless device and subscription information of a subscriber. The instructions are further executable by the processor to provide programming credentials to a programming module based on both the device information and the subscription information. The programming credentials are used to authenticate the wireless device to enable programming of the wireless device with access credentials of an access point of a network.

In a particular embodiment, a method of automatically configuring a wireless device includes receiving, at a programming module, a programming request message including a request for programming of the wireless device. The method includes sending to the wireless device one or more authentication messages including programming credentials. The method further includes sending to the wireless device one or more programming messages including access credentials of an access point of a network.

In a particular embodiment, an apparatus for automatically configuring a wireless device includes a processor and a memory storing instructions executable by the processor. The instructions are executable by the processor to detect receipt of a programming request message including a request for programming of the wireless device. The instructions are further executable by the processor to initiate sending to the wireless device one or more authentication messages including programming credentials. The instructions are also executable by the processor to initiate sending to the wireless device one or more programming messages including access credentials of an access point of a network.

In a particular embodiment, a method of automatically configuring a wireless device includes receiving, at the wireless device, a service discovery message including device programming capability information. The method includes sending to a programming module a programming request message including a request for programming of the wireless device. The method further includes receiving, at the wireless device, one or more authentication messages including programming credentials. The method also includes receiving, at the wireless device, one or more programming messages including access credentials of an access point of a network.

In a particular embodiment, a wireless device includes a processor and a memory storing instructions executable by the processor. The instructions are executable by the processor to detect receipt of a service discovery message including device programming capability information. The instructions are executable by the processor to initiate sending to a programming module a programming request message including a request for programming of the wireless device. The instructions are further executable by the processor to detect receipt of one or more authentication messages including programming credentials. The instructions are also executable by the processor to detect receipt of one or more programming messages including access credentials of an access point of a network.

In a particular embodiment, a method of automatically configuring a wireless device includes performing service discovery by a programming device that includes a programming module to identify the wireless device. The method includes establishing a wireless connection by the programming device between the programming device and the wireless device. The method further includes authenticating the wireless device based on programming credentials. The method also includes programming the wireless device with access credentials of an access point of a network to enable the wireless device to communicate, via the access point, with devices outside of the network.

In a particular embodiment, a wireless device includes a processor and a memory storing instructions executable by the processor. The instructions are executable by the processor to perform service discovery to identify the wireless device and to establish a wireless connection with the wireless device. The instructions are further executable by the processor to authenticate the wireless device based on programming credentials. The instructions are also executable by the processor to program the wireless device with access credentials of an access point of a network to enable the wireless device to communicate, via the access point, with devices outside of the network.

In a particular embodiment, a method of automatically configuring a wireless device includes performing service discovery by the wireless device to identify a programming device including a programming module. The method includes establishing a wireless connection with the programming device. The method further includes sending to the programming device a probe request including a first device public key and receiving from the programming device a probe response that includes an indication of a match between the first device public key and a second device public key.

In a particular embodiment, a wireless device includes a processor and a memory storing instructions executable by the processor. The instructions are executable by the processor to perform service discovery by the wireless device to identify a programming device including a programming module. The instructions are further executable by the processor to establish a wireless connection with the programming device. The instructions are also executable by the processor to initiate sending to the programming device a probe request including a first device public key. The instructions are also executable to detect receipt of a probe response including an indication of a match between the first device public key and a second device public key.

One particular advantage provided by at least one of the disclosed embodiments is automatic configuration of a wireless device to communicate, via an access point of a network, where the wireless device may not have a data entry and/or display interface.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 1:
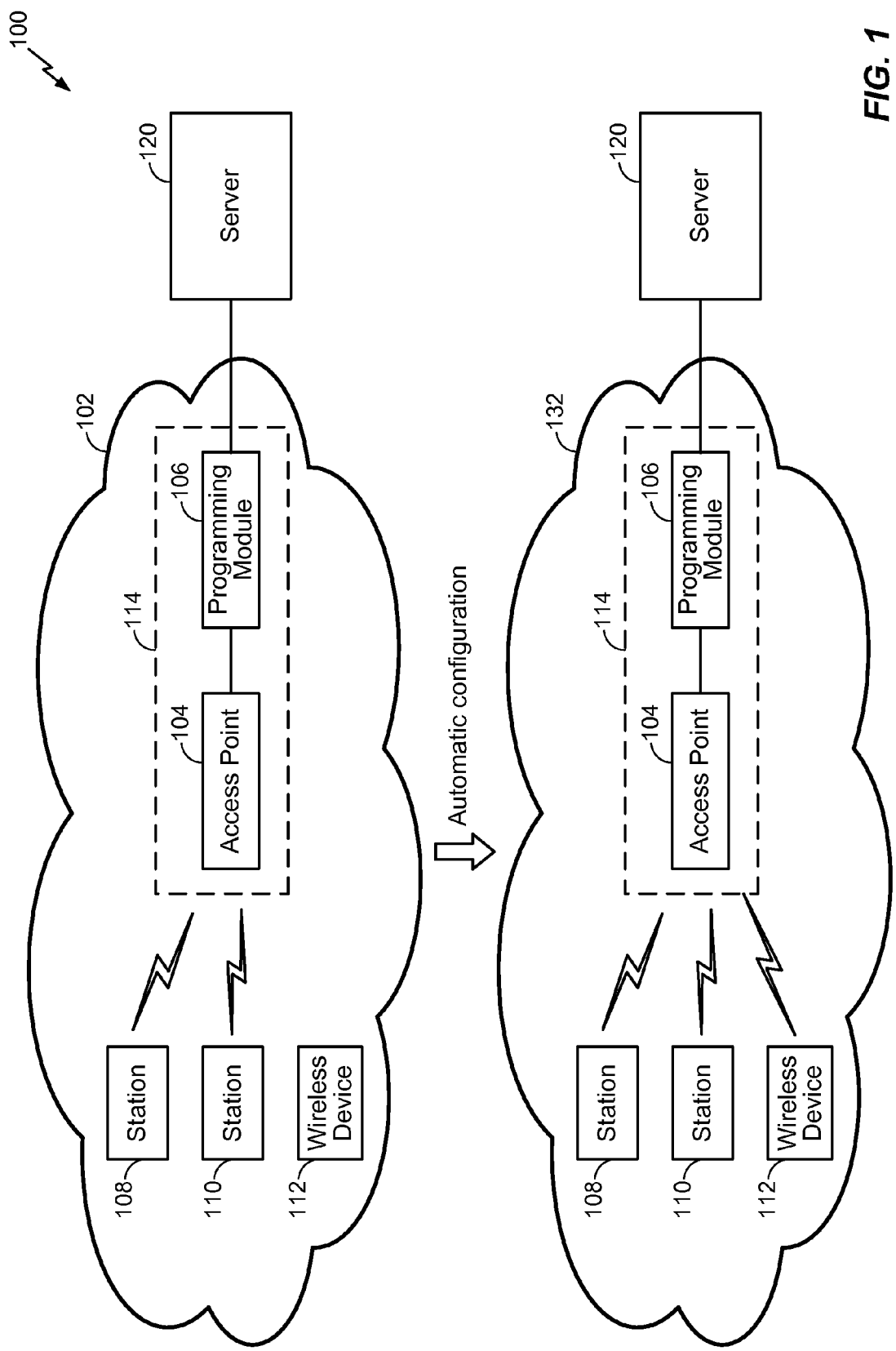
FIG. 1 is a diagram of a particular illustrative embodiment of a system for automatically configuring a wireless device to communicate via an access point of a network.
Figure 5:
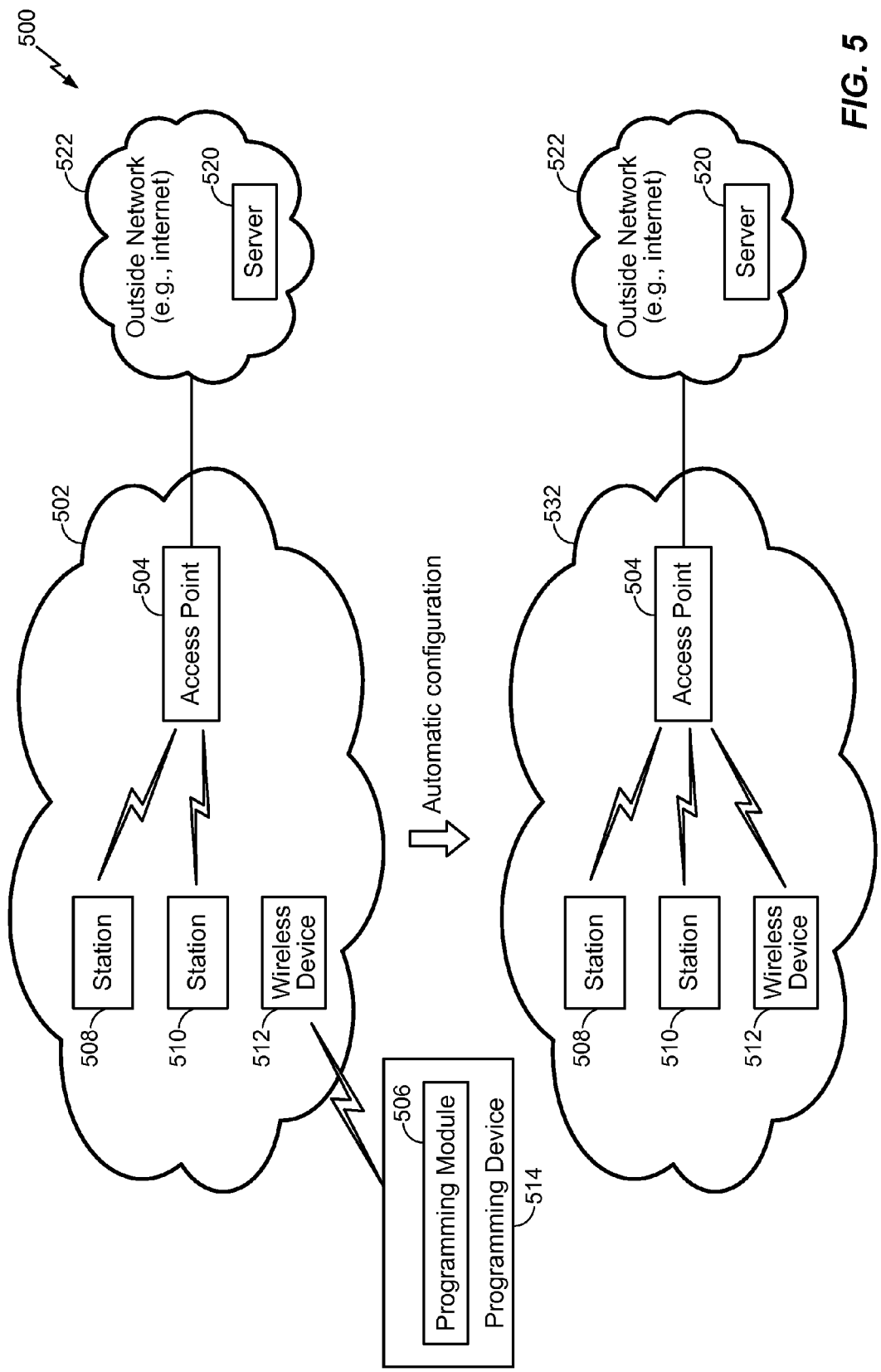
Figure 6:
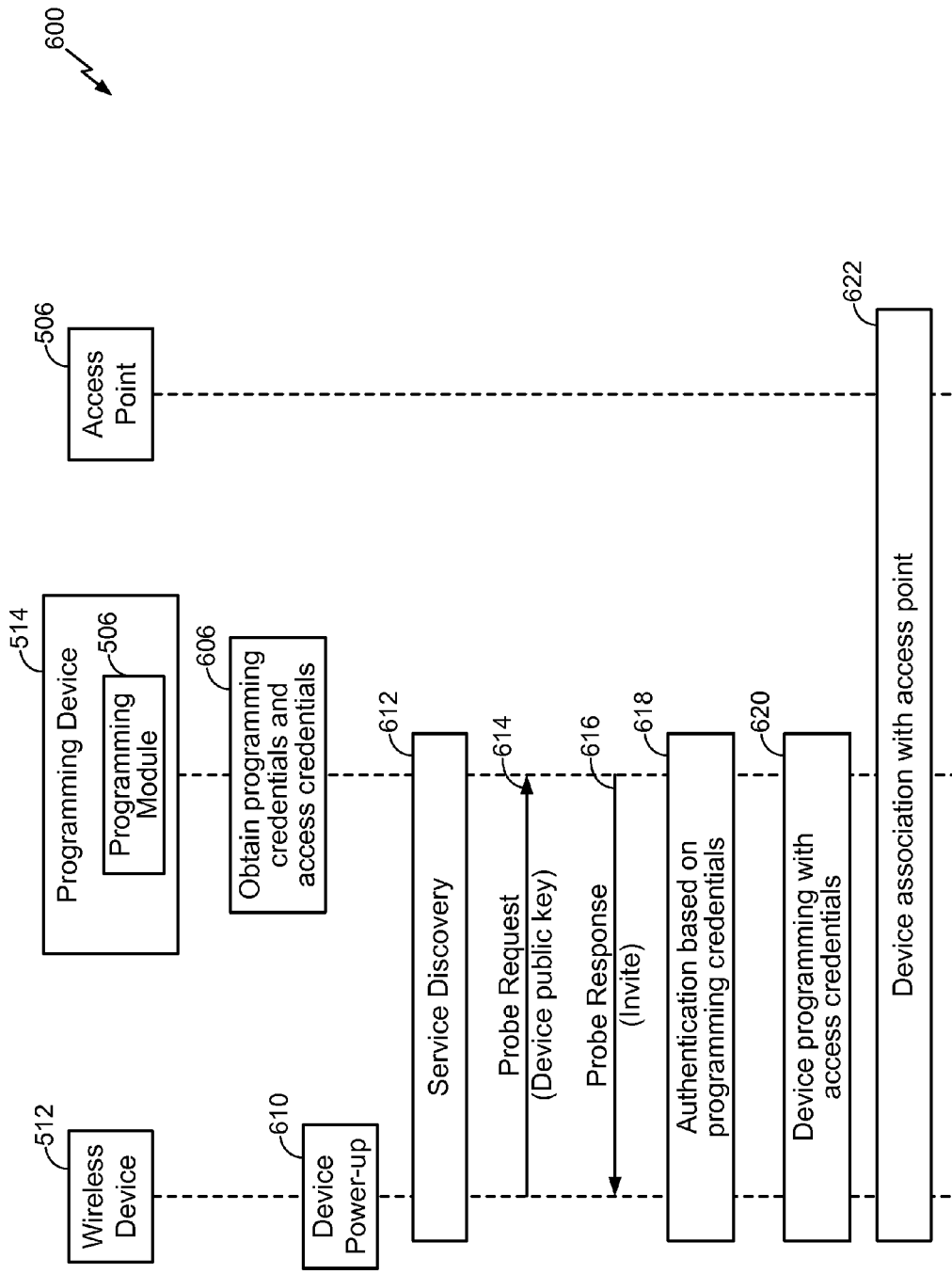
Figure 7:
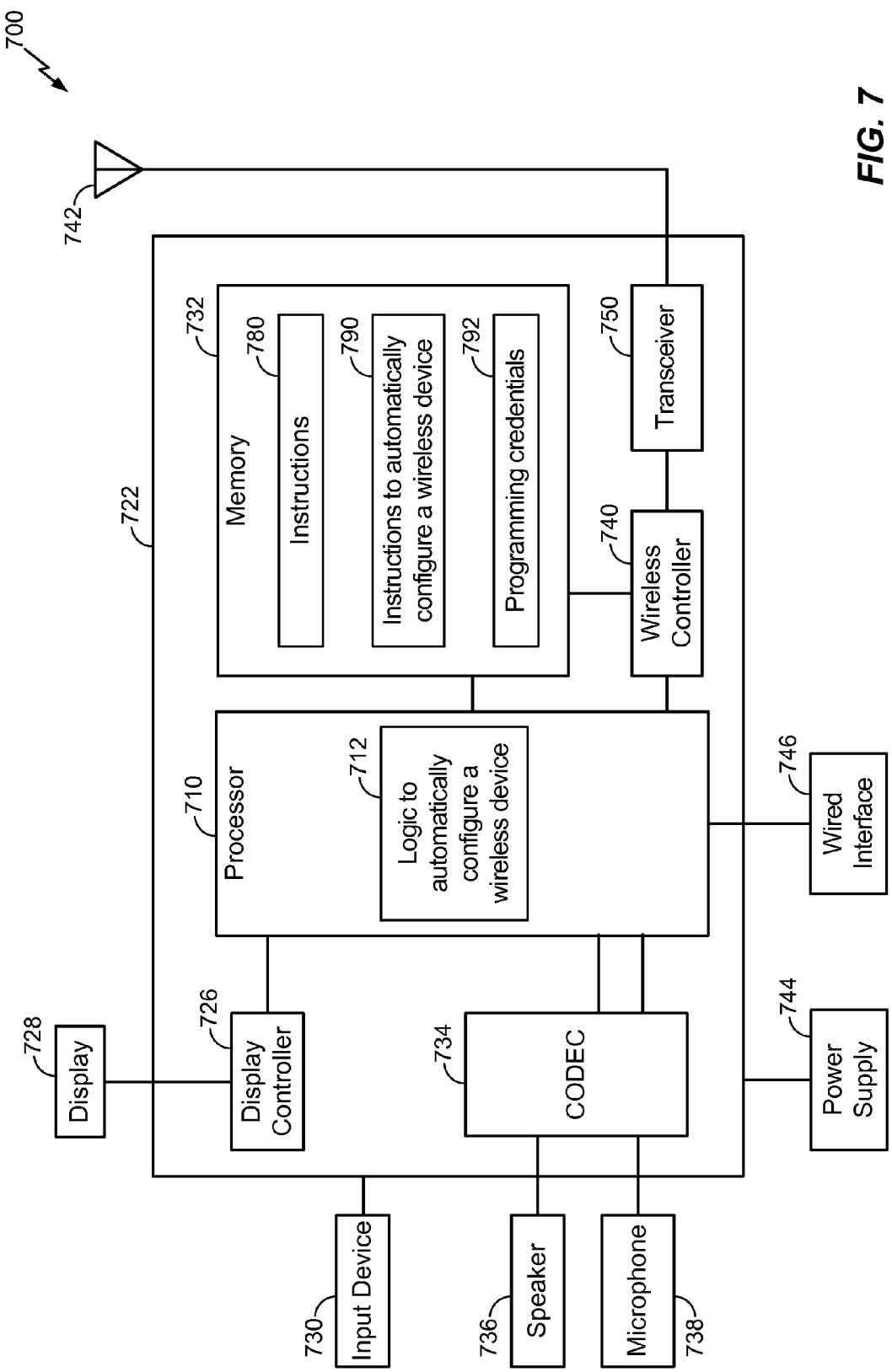

FIG. 5 is a diagram of another particular illustrative embodiment of a system for automatically configuring a wireless device to communicate via an access point of a network; and FIG. 6 is a diagram of a particular embodiment of a method of automatically configuring a wireless device to communicate via the access point of the network in the system of FIG. 5; and FIG. 7 is a block diagram of a particular embodiment of a wireless device operable to configure a wireless device to communicate via the access point of the network of FIG. 1 and/or FIG. 5 and also operable to be configured to communicate via the access point of the network of FIG. 1 and/or FIG. 5.

VI. DETAILED DESCRIPTION

Referring to FIG. 1, a particular illustrative embodiment of a system for automatically configuring a wireless device to communicate via an access point of a network is disclosed and generally designated 100. FIG. 1 illustrates a network 102 and a network 132. The network 102 includes a wireless device 112 prior to automatic configuration of the wireless device 112. The network 132 corresponds to the network 102 after the automatic configuration of the wireless device 112. Descriptions of FIG. 1 with respect to the network 102 are equally applicable to the network 132 with the exception that the wireless device 112 in the network 102 is not yet configured to communicate via an access point 104 of the network 102, 132 with devices that are outside the network 102, 132.

The system 100 may include a server 120 and the network 102. The network 102 may be coupled with the server 120 via a wired or wireless connection or a connection network. In a particular embodiment, the server 120 may be a smart energy server that interacts with devices at a user's premises. To illustrate, the smart energy server may be compliant with one or more standards that support control of metering infrastructure and networks, such as home networks. For example, the server 120 may be compliant with the ZigBee Smart Energy V2.0 standard. In a particular embodiment, the server 120 may be a cloud server that provides shared resources (e.g., application software) over a network (e.g., the internet).

In a particular embodiment, the network 102 includes the access point 104 and a programming module 106. The access point 104 may be coupled to the programming module 106 via a wired connection or a wireless connection. In a particular embodiment, the access point 104 and the programming module 106 may be integrated into a single device 114 that operates both as the access point 104 and the programming module 106. The network 102 may further include a first station 108 and a second station 110 that are configured to communicate with other devices (e.g., the server 120) via the access point 104. For example, the first station 108 and the second station 110 may be a computer (e.g., a tablet computer, a laptop computer, a desktop computer, etc) or another device configured to wirelessly communicate data via the access point 104.

The network 102 may also include the wireless device 112 that is not yet configured to communicate with other devices (e.g., the server 120) via the access point 104. In a particular embodiment, the network 102 may be a customer premises network, such as a home area network or a business local area network.

In a particular embodiment, the access point 104 may enable the wireless device 112, after the wireless device 112 is configured, to communicate with other devices outside the network 102. For example, the access point 104 may enable the wireless device 112 to communicate with the server 120 via the access point 104. The access point 104 may also enable the programming module 106 to configure the wireless device 112. For example, the programming module 106 may send and receive authentication and programming messages to and from the wireless device 112 via the access point 104. In a particular embodiment, the access point 104 may be compliant with one or more Institute of Electrical and Electronic Engineers (IEEE) 802.11 standards.

In a particular embodiment, the wireless device 112 may need to be configured by the programming module 106 to communicate, via the access point 104, with devices that are outside of the network 102. To illustrate, the wireless device 112 may be a device without a data entry and/or display interface for manual configuration of the wireless device 112. For example, the wireless device 112 may be a home appliance, a meter configured to take measurements, a mobile device, a camera, a multimedia player, an entertainment unit, a navigation device, or any combination thereof. In a particular embodiment, the wireless device 112 may be compliant with one or more IEEE 802.11 standards.

In a particular embodiment, the wireless device 112 may communicate with the programming module 106 via the access point 104. For example, the wireless device 112 may exchange messages with the programming module 106 using a wireless connection between the wireless device 112 and the access point 104. After the configuration of the wireless device 112 by the programming module 106, the wireless device 112 may communicate, via the access point 104, with devices that are outside of the network 132.

In a particular embodiment, the programming module 106 may be configured to perform service discovery to identify one or more available wireless devices to configure for communication, via the access point 104, with the devices outside of the network 132.

In a particular embodiment, the programming module 106 may configure the wireless device 112 to communicate, via the access point 104, with devices outside the network 102. To illustrate, the programming module 106 may authenticate the wireless device 112 based on programming credentials received from the server 120. For example, the programming module 106 may authenticate the wireless device 112 by exchanging authentication messages with the wireless device 112 through the access point 104. Authenticating the wireless device 112 based on the programming credentials may unlock the wireless device 112, and unlocking the wireless device 112 may enable programming of the wireless device 112 with access credentials of the access point 104.

During operation, the programming module 106 may communicate with the wireless device 112 via the access point 104 to configure the wireless device 112. The programming module 106 may authenticate the wireless device 112 based on the programming credentials. For example, the programming module 106 may receive the programming credentials from the server 120. In a particular embodiment, the programming module 106 and the access point 104 may establish a secure connection prior to authenticating the wireless device. After authenticating the wireless device 112 to unlock the wireless device 112, the programming module 106 may program the wireless device 112 with the access credentials of the access point 104. For example, the programming module 106 may obtain the access credentials of the access point 104 from the access point 104 itself. Alternatively, the programming module 106 may receive the access credentials from the server 120. Upon successful authentication and programming of the wireless device 112, the wireless device 112 may communicate, via the access point 104, with devices that are outside of the network 132. To illustrate, the server 120 may retrieve information from the wireless device 112 via the access point 104 of the network 132. The server 120 may further control one or more operations of the wireless device 112 via the access point 104 of the network 132. Additionally, the wireless device 112 may intermittently send information to the server 120.

In a particular embodiment, the programming module 106 may program the wireless device 112 with access credentials of the access point 104 to enable the wireless device 112 to communicate with devices outside of the network 102 via the access point 104. For example, the access credentials may include a service set identifier (SSID) of the access point 104 and/or a passphrase of the access point 104. The programming module 106 may be configured to receive the access credentials from the access point 104 and apply the received access credentials to the wireless device 112. As another non-limiting example, the access credentials may be input directly into the programming module 106. For example, a user may input the access credentials directly into the programming module 106 via a data input interface of the programming module 106 or of a device that includes the programming module 106. Alternatively, out-of-band mechanisms such as near field communication (NFC) and QR may be used to obtain the access credentials.

The network 132 corresponds to the network 102 after the configuration of the wireless device 112 by the programming module 106. After configuration, the wireless device 112 may communicate via the access point 104 with devices that are outside of the network 132.

By automatically configuring the wireless device 112, the wireless device 112 may communicate via the access point 104 with devices that are outside of the network 102, 132. Automatic configuration of the wireless device 112 by the programming module 106 enables configuration of a wireless device with no user involvement, or limited user involvement, in the configuration process. Additionally, automatic configuration by the programming module 106 enables configuration of wireless devices that do not have a data entry and/or display interface for manual configuration.

Although FIG. 1 shows two stations 108, 110 other than the wireless device 112 in the network 102, 132, in alternative embodiments, the network 102, 132 may include more than two stations or fewer than two stations.

Figure 2:
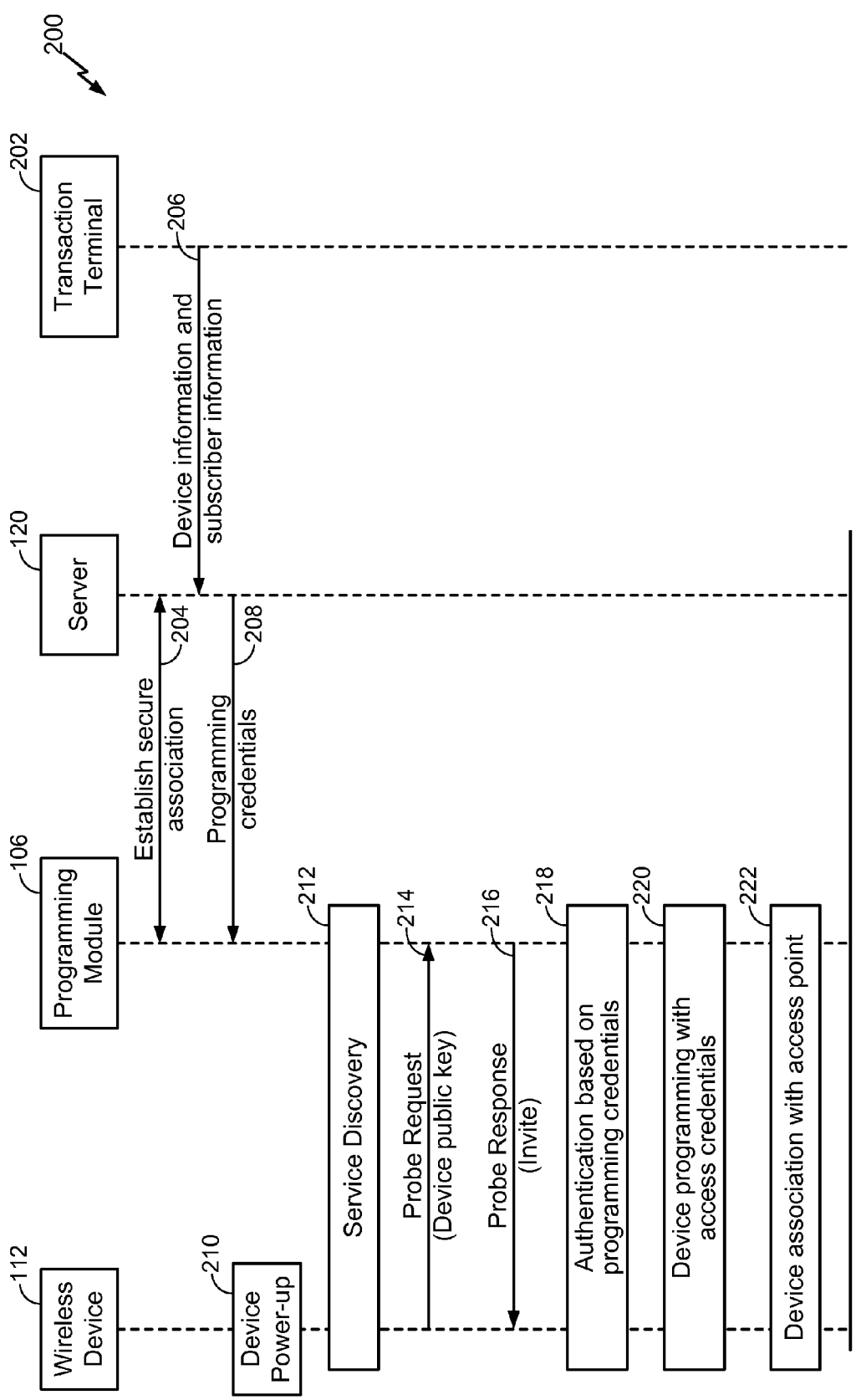
FIG. 2 is a diagram of a particular illustrative embodiment of a method of automatically configuring the wireless device to communicate via the access point of the network in the system of FIG. 1.

Referring to FIG. 2, a particular embodiment of a method of automatically configuring the wireless device 112 to communicate via the access point 104 of the network 132 in the system 100 of FIG. 1 is disclosed and generally designated 200. FIG. 2 illustrates operation of the wireless device 112, the programming module 106, and the server 120 of FIG. 1. FIG. 2 further illustrates a transaction terminal 202. In a particular embodiment, the transaction terminal 202 may be a point-of-sale terminal for purchasing the wireless device 112.

The method 200 includes establishing a secure association between the server 120 and the programming module 106, at 204. For example, upon a service subscription by a subscriber, the subscriber may provide relevant information to a service provider to enable the establishment of the secure association between the server 120 and the programming module 106. The method 200 may include receiving, at the server 120, device information of the wireless device 112 and subscriber information of a subscriber from the transaction terminal 202, at 206. For example, when a user purchases the wireless device 112 from a vendor, the transaction terminal 202 may send the device information and the subscriber information to the server 120. In a particular embodiment, the device information may include a serial number of the wireless device 112, and the subscriber information may include an account number of the subscriber associated with the service provider (for example, an electric power company).

In a particular embodiment, the server 120 may provide programming credentials to a programming module 106 based on the device information and the subscription information. The programming credentials may be used to authenticate the wireless device 112 to enable programming of the wireless device 112 with access credentials of the access point 104 of FIG. 1.

The method 200 also includes providing, by the server 120, programming credentials to the programming module 106, at 208. For example, the programming credentials may include a shared key. Alternatively, the programming credentials may include a digital certificate, or a user-name and a password, or information stored within a subscriber identity module (SIM). In a particular embodiment, the programming module 106 may receive the programming credentials from the server 120 and may store the programming credentials for future use.

The method 200 may include powering up the wireless device 112, at 210. For example, the wireless device 112 may power-up in response to an input from a user or at particular intervals. The method 200 may further include performing service discovery, at 212. In a particular embodiment, the wireless device 112 may perform the service discovery in response to powering up. For example, the wireless device 112 may perform service discovery to identify the programming module 106 after power up. To illustrate, the wireless device 112 may perform service discovery before configuration of the wireless device 112 is initiated by the programming module 106. To illustrate, service discovery is used by the wireless device 112 to determine which access point the wireless device 112 should try to join. For example, there may be more than one access point at a home, and one of the access points may be connected to a smart utility company. When the wireless device 112 (e.g., a smart-utility device) is powered up, the wireless device 112 determines the access point that is connected to the smart utility company using a service discovery procedure. The service discovery may use existing service discovery protocols such as Bonjour. However, new profiles may be added for different kinds of service networks. In a particular embodiment, the wireless device 112 is adapted to use a probe request message or an access network query protocol (ANQP) message to perform service discovery. In a particular alternative embodiment, the wireless device 112 may perform service discovery to restore communication via the access point 104. Even though the programming module 106 may not be in the same domain that the wireless device 112 may be joining, the programming module 106 may proxy the service discovery procedure so that the wireless device 112 can select the programming module 106. After the programming is completed, the programming module 106 may remain outside of the domain that the wireless device 112 is associated with.

In a particular alternative embodiment, the programming module 106 may perform service discovery to identify the wireless device 112, at 212. For example, the programming module 106 may perform the service discovery based on beacons, public action frames, a probe request message, or any combination thereof. In a particular alternative embodiment, the service discovery identifiers identify the domain of the network. The service discovery identifiers may be accessed from beacons, public action frames, a probe request message, or higher layer packets (IP) that are carried using beacons, public action frames, or a probe request message.

The method 200 includes sending a probe request, by the wireless device 112, to the programming module 106, at 214. The probe request may include a first device public key. The programming module 106 may receive the first device public key from the wireless device 112 and compare the first device public key with a second device public key. In a particular embodiment, the second device public may be a device key that is received by the programming module 106 from the server 120. If the programming module 106 determines that there is a match between the first device public key and the second device public key, the programming module 106 may send a probe response including an indication of the match. In an alternative embodiment, the serial number of the wireless device 112 or any device specific identity information of the wireless device 112 may be used instead of public key. The wireless device 112 may receive the probe response from the programming module 106, at 216. In a particular embodiment, the probe request may also include a request for device programming.

In a particular embodiment, the programming module 106 may send an invitation to the wireless device 112 to initiate configuration of the wireless device 112. For example, the programming module 106 may use beacon frames, generic advertisement service (GAS) frames, or probe response messages to send the invitation to the wireless device 112. In a particular embodiment, the programming module 106 may send a re-invitation to the wireless device 112 to re-initiate the configuration of the wireless device 112. For example, the programming module 106 may send the re-invitation in response to a change in access credentials of the access point 104.

The method 200 further includes authenticating, by the programming module 106, the wireless device 112 based on programming credentials, at 218. For example, the programming module 106 may authenticate the wireless device 112 by exchanging authenticating messages with the wireless device 112 (as described with respect to FIGS. 3 and 4). Authentication of the wireless device 112 may unlock the wireless device 112. Unlocking the wireless device 112 may enable programming of the wireless device 112 with access credentials of the access point 104 of the network 102 of FIG. 1.

The method 200 further includes, upon successful authentication of the wireless device 112, programming of the wireless device 112 with the access credentials of the access point 104, at 220. To illustrate, the programming module 106 may receive the access credentials from the access point 104 and program the wireless device 112 with the received access credentials. The access credentials may include a service set identifier (SSID) of the access point 104 and/or a passphrase of the access point 104. For example, if a smart phone including the programming module 106 is connected to the access point 104 and the smart phone is used for programming the wireless device 112, the smart phone can clone the access credentials to the new wireless device. In a particular embodiment, the programming module 106 may store the received access credentials for future use. After the wireless device 112 is programmed with the access credentials of the access point 104, the wireless device 112 may be configured to communicate, via the access point 104, with the server 120 or other devices.

The method 200 also includes performing device association of the wireless device 112 with the access point 104, at 222. The device association of the wireless device 112 with the access point 104 is performed based on the configuration of the wireless device 112 (including the programming of the wireless device 112 with the access credentials of the access point 104). The device association establishes a relationship between the wireless device 112 and the access point 104 that enables the wireless device 112 to communicate with devices outside of the network 132 via the access point 104. After the wireless device 112 is associated with the access point 104, the wireless device 112 may communicate with the server 120 and other devices outside of the network 132 of FIG. 1 via the access point 104.

Although FIG. 2 and the description of the method 200 of FIG. 2 refer to the programming module 106, in another embodiment, the single device 114 of FIG. 1 may be used in place of the programming module 106 without diverging from the method 200 described above.

Figure 3:
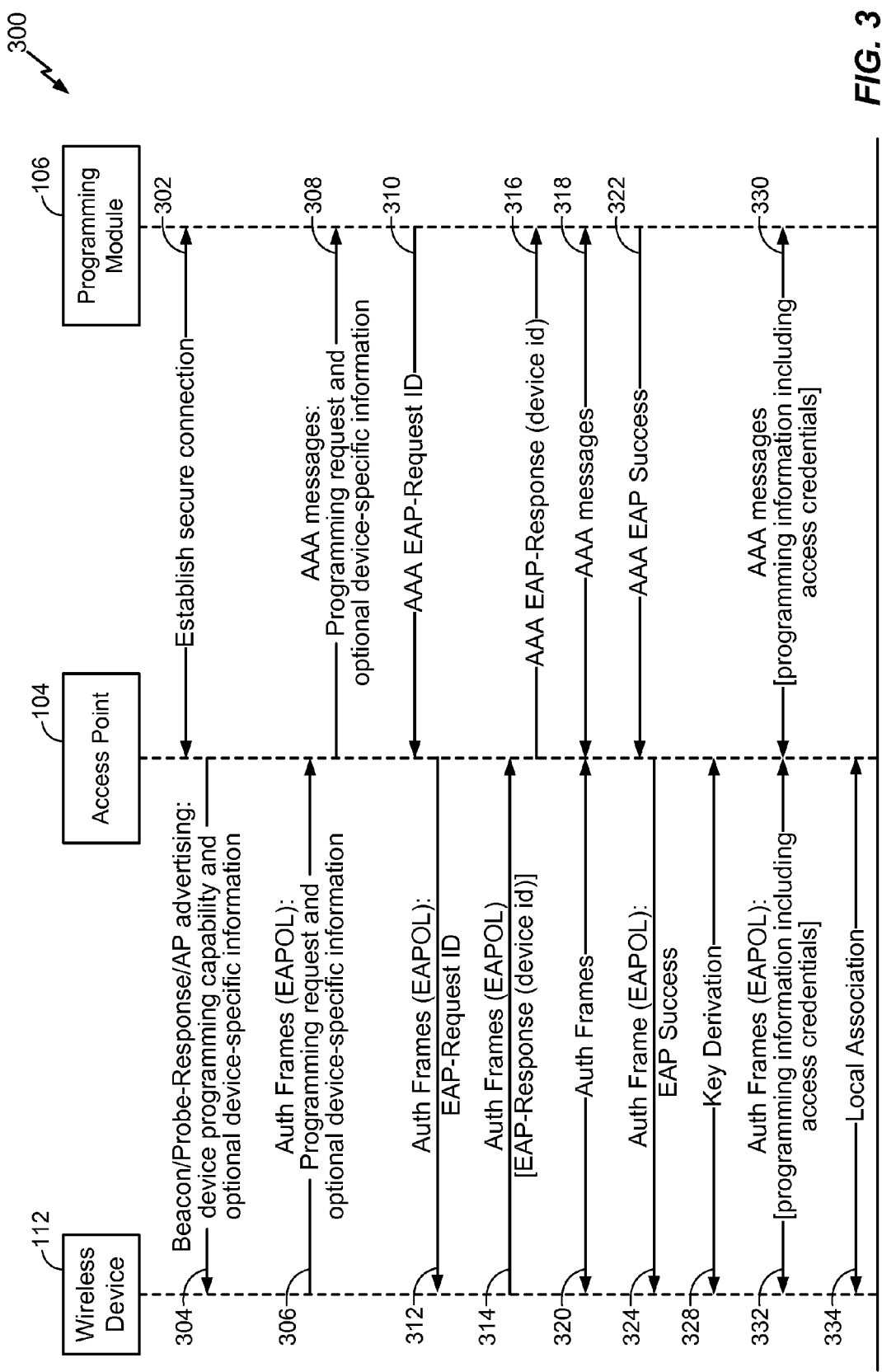
FIG. 3 is a diagram of a particular illustrative embodiment of a method of automatically configuring the wireless device to communicate via the access point of the network in the system of FIG. 1 according to the method of FIG. 2.

Referring to FIG. 3, a particular embodiment of a method of automatically configuring the wireless device 112 to communicate via the access point 104 of the network 132 in the system 100 of FIG. 1 according to the method 200 of FIG. 2 is disclosed and generally designated 300. FIG. 3 illustrates operation of the wireless device 112, the access point 104, and the programming module 106 of FIG. 1.

In the method 300, the programming module 106 and the wireless device 112 send and receive messages to and from each other through the access point 104. The access point 104 serves as a conduit to enable configuration of the wireless device 112 by the programming module 106.

The method 300 may include establishing a secure connection between the programming module 106 and the access point 104, at 302. The secure connection between the programming module 106 and the access point 104 may be established prior to authentication of the wireless device 112. This may be achieved by means of a trusted network or using an authentication and authorization protocol session (e.g. an Internet Engineering Task Force (IETF) Network Working Group Request For Comments (RFC) 2866 Remote Authentication Dial In User Service (RADIUS)-type protocol session or RFC 3588 (Diameter)-type protocol session). The method 300 further includes sending a service discovery message by the access point 104 using a beacon, a probe response, and/or an access point advertising message, at 304. The access point 104 may also send device programming capability information in the service discovery message. For example, the access point 104 may also send device programming capability information in the beacon, the probe response, and/or in the access point advertising message. The access point 104 may also send device specific information including, for example, a serial number of the wireless device 112 in the service discovery message. The wireless device 112 may receive the service discovery message including the device programming capability information.

The method 300 may include sending, by the wireless device 112, a programming request message to the programming module 106 via the access point 104, at 306. The programming request message may include a request for programming of the wireless device 112. In a particular embodiment, the programming request message may include device specific information of the wireless device 102, such as, for example, the serial number of the wireless device 112. The wireless device 112 may send the programming request message using one or more authentication frames. For example, the one or more authentication frames may be extensible authentication protocol over local area network (EAPOL) frames.

The programming module 106 may receive the programming request message from the wireless device 112 via the access point 104, at 308. For example, the programming module 106 may receive the programming request message as one or more Authentication Authorization and Accounting (AAA) protocol messages. After receiving the programming request message from the wireless device 112, the programming module 106 may send an identification request message to the wireless device 112 via the access point 104, at 310. The identification request message may include a request for identification information of the wireless device 112. For example, the identification request message may include an extensible authentication protocol (EAP) identification request. The wireless device 112 may receive the identification request message from the programming module 106 via the access point 104, at 312. For example, the wireless device 112 may receive the identification request message within one or more EAPOL frames.

The method 300 may include, in response to receiving the identification request message, sending an identification response message including the identification information of the wireless device 112 to the programming module 106 via the access point 104, at 314. For example, the identification information may include the serial number of the wireless device 112. The programming module 106 may receive the identification response message from the wireless device via the access point 104, at 316. The programming module 106 may receive the identification response message as one or more AAA protocol messages including an EAP identification response.

The method 300 further includes sending, by the programming module 106, one or more authentication messages to the wireless device 112 via the access point 104, at 318. In a particular embodiment, at least one of the one or more authentication messages may include the programming credentials. To illustrate, the programming module 106 may be configured to authenticate the wireless device 112 based on the programming credentials. The programming module 106 may send the one or more authentication messages as one or more AAA protocol messages. The method 300 may also include receiving, at the wireless device 112, the one or more authentication messages from the programming module 106 via the access point 104, at 320.

The method 300 may further include sending, by the wireless device 112, at least one authentication message to the programming module 106 via the access point 104, at 320. The programming module 106 may receive the at least one authentication message from the wireless device 112 via the access point 104, at 318. As illustrated in FIG. 3, the programming module 106 may receive the at least one authentication message as one or more AAA protocol messages.

In a particular embodiment, the one or more authentication messages may be sent to the wireless device 112, at 318, and the at least one authentication message may be received at the programming module 106, at 318, to authenticate the wireless device 112 in accordance with one or more Institute of Electrical and Electronic Engineers (IEEE) 802.11 standards.

The method 300 may include sending, by the programming module 106, an authentication success message to the wireless device 112 via the access point 104, at 322. The authentication success message may indicate a successful authentication of the wireless device 112 by the programming module 106. For example, the programming module 106 may send the authentication success message as one or more AAA protocol messages including an EAP success indication. Authenticating the wireless device 112 based on the programming credentials may unlock the wireless device 112 for programming with the access credentials. The method 300 may further include receiving the authentication success message from the programming module 106 via the access point 104, at 324. For example, the wireless device 112 may receive the identification authentication success message within one or more EAPOL frames. The method 300 may also include key derivation communication between the wireless device 112 and the access point 104, at 328. After the authentication is successfully completed, the wireless device unlocks the non volatile memory of the device that is used for storing the access network credentials, such as SSID and passphrase. After the access network credentials (e.g. SSID or passphrase) are programmed into the non volatile memory of the device, the device locks the memory.

The method 300 further includes sending, by the programming module 106, one or more programming messages to the wireless device 112 via the access point 104, at 330. For example, the programming module 106 may send the one or more programming message as AAA protocol messages. The one or more programming messages may include the programming information including the access credentials of the access point 104 of the network 102, 132 of FIG. 1. The wireless device 112 may be configured to be programmed with the access credentials of the access point 104. The method 300 may include receiving, at the wireless device 112, the one or more programming messages via the access point 104, at 332. For example, the wireless device 112 may receive the one or more programming messages within one or more EAPOL frames.

In a particular embodiment, the wireless device 112 may send one or more programming response messages to the programming module 106 via the access point 104, at 332. The one or more programming response messages may include acknowledgement of programming of the wireless device 112 with the access credentials of the access point 104. The wireless device 112 may send the one or more programming response messages within one or more EAPOL frames. The programming module 106 may receive the one or more programming response messages from the wireless device 112 via the access point 104, at 330. For example, the programming module 106 may receive the one or more programming response messages as one or more AAA protocol messages. The method 300 also includes performing local association of the wireless device 112 with the access point 104, at 334. Performing the local association, at 334, may enable the wireless device 112 to communicate with the programming module 106 using data frames instead of authentication frames, such as EAPOL frames.

In the above described method 300, messages that are sent by or received at the programming module 106, at 308, 310, 316, 318, 322, and 330, may be Authentication Authorization and Accounting (AAA) protocol messages, such as described above with respect to some of the messages. Further, each message sent by or received at the wireless device 112, at 306, 312, 314, 320, 324, and 332 may be respectively sent or received using one or more authentication frames, such as described above with respect to some of the messages. For example, the authentication frames that are sent to or received at the wireless device 112 may be extensible authentication protocol over local area network (EAPOL) frames.

Figure 4:
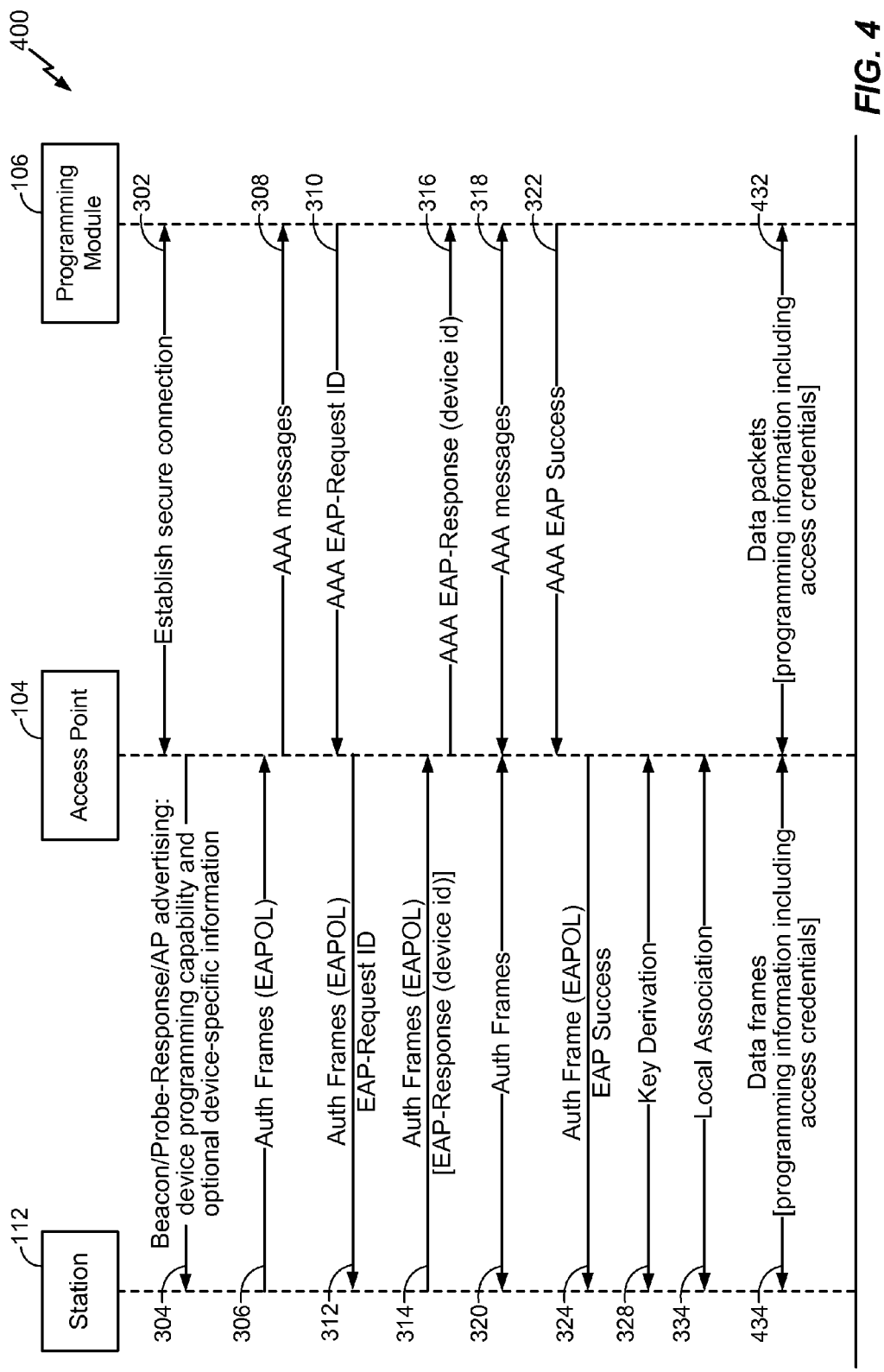
FIG. 4 is a diagram of another particular illustrative embodiment of a method of automatically configuring a wireless device to communicate via the access point of the network in the system of FIG. 1 according to the method of FIG. 2.

Referring to FIG. 4, another particular embodiment of a method of automatically configuring the wireless device 112 to communicate via the access point 104 of the network 102 in the system 100 of FIG. 1 according to the method 200 of FIG. 2 is disclosed and generally designated 300. FIG. 3 illustrates operation of the wireless device 112, the access point 104, and the programming module 106 of FIG. 1.

The method 400 is performed, at 302-328, in the manner described with respect to the method 300 of FIG. 3. The method 400 may include performing local association of the wireless device 112 with the access point 104, at 430. In contrast to the method 300 of FIG. 3, the local association is performed, at 430, prior to the programming module 106 sending programming messages to the wireless device 112. Following the local association, at 430, the method 400 may also include sending, by the programming module 106, one or more programming messages to the wireless device 112 via the access point 104, at 432. For example, the programming module 106 may send, at 432, the one or more programming messages within data packets. The one or more programming messages may include the programming information including the access credentials of the access point 104 of the network 102, 132 of FIG. 1. The method 400 further includes receiving, at the wireless device 112, the one or more programming messages, at 434. For example, the wireless device 112 may receive the one or more programming messages within one or more data frames. To illustrate, the wireless device 112 may receive the one or more data frames via a port that enables the wireless device 112 to communicate with the programming module 106, via the access point 104, using data frames.

In a particular embodiment, the wireless device 112 may send one or more programming response messages to the programming module 106 via the access point 104, at 434. The one or more programming response messages may include acknowledgement of programming of the wireless device 112 with the access credentials of the access point 104. The wireless device 112 may send the one or more programming response messages within one or more data frames. The programming module 106 may receive the one or more programming response messages from the wireless device 112 via the access point 104, at 432. For example, the programming module 106 may receive the one or more programming response messages within data packets.

Referring to FIG. 5, another particular illustrative embodiment of a system for automatically configuring a wireless device to communicate via an access point of a network is disclosed and generally designated 500. FIG. 5 illustrates a network 502 and a network 532. The network 502 includes a wireless device 512 prior to being automatically configured. The network 532 corresponds to the network 502 after the automatic configuration the wireless device 512. Descriptions of FIG. 5 with respect to the network 502 are applicable to the network 532 with the exception that the wireless device 512 in the network 502 is not yet configured to communicate via an access point 504 of the network 502, 532 with devices (e.g., a server 520) that are outside the network 502, 532.

In a particular embodiment, the system 500 may include the network 502, a programming device 514, and a second network 522 including a server 520. The network 502 may be coupled to the second network 522 via a wired or wireless connection. In a particular embodiment, the network 502 may be a customer premises network (e.g., a home local area network, a business local area network, etc), and the second network 522 may be the internet.

In a particular embodiment, the network 502 may include the access point 504, a first station 508, and a second station 510. The first station 508 and the second station 510 may be configured to communicate with other devices (e.g., the server 520) via the access point 504. For example, the first station 508 and the second station 510 may be a computer (e.g., a tablet computer, a laptop computer, a desktop computer, etc) or another device configured to wirelessly communicate data via the access point 504. The network 502 may also include the wireless device 512 that is not yet configured to communicate, via the access point 504, with other devices (e.g., the server 520).

In a particular embodiment, the access point 504 may enable the wireless device 512, after the wireless device 512 is configured, to communicate with other devices outside the network 502 via the access point 504. For example, the access point 504 may enable the wireless device 512, after the wireless device 512 is configured, to communicate with the server 520. In a particular embodiment, the access point 504 may be compliant with one or more Institute of Electrical and Electronic Engineers (IEEE) 802.11 standards. After the authentication is successfully completed, the wireless device unlocks the non volatile memory of the device that is used for storing the access network credentials, such as SSID and passphrase. After the access network credentials (e.g. SSID or passphrase) are programmed into the non volatile memory of the device, the device locks the memory.

In a particular embodiment, the wireless device 512 may need to be configured by the programming module 506 to communicate, via the access point 504, with devices that are outside of the network 502, 532. To illustrate, the wireless device 512 may be a device without a data entry and/or display interface for manual configuration of the wireless device 512 with access credentials of the access point 504. For example, the wireless device 512 may be a home appliance (e.g., a refrigerator, a microwave oven, a dish washer, a clothes washing machine, a clothes dryer, an air conditioning unit, an electric water heater, an electric furnace), a meter configured to take measurements (e.g., an electricity meter, a water meter, a gas meter), a mobile device, a camera, a multimedia player, an entertainment unit, a navigation device, or any combination thereof. In a particular embodiment, the wireless device 512 may be compliant, or include a component that is compliant, with one or more IEEE 802.11 standards.

In a particular embodiment, the programming device 514 may include a programming module 506 that is capable of configuring the wireless device 512 to communicate, via the access point 504, with devices that are outside of the network 502, 532. To illustrate, the programming device 514 may be configured to perform service discovery to identify the wireless device 512. For example, the programming device 514 may perform the service discovery based on a beacon, a public action frame, a probe request message, or any combination thereof. In a particular embodiment, the programming device 514 may be a smart phone, a personal digital assistant (PDA), a computer, a portable memory that is connected to a computing device, or any combination thereof.

In a particular embodiment, the programming device 514 may establish a wireless connection 516 between the programming device 514 and the wireless device 512. The programming module 506 may configure the wireless device 512 via the wireless connection 516. For example, the wireless connection 516 between the programming device 514 and the wireless device 512 may be a peer-to-peer connection (e.g. wifi direct). To illustrate, the programming device 514 may establish the peer-to-peer connection between the programming device 514 and the wireless device 512 in accordance to one or more of a Bluetooth standard, Institute of Electrical and Electronic Engineers (IEEE) 802.11 standards, or another peer-to-peer standard. After the wireless connection 516 between the programming device 514 and the wireless device 512 is established, the programming module 506 may configure the wireless device 512 via the wireless connection 516.

In a particular alternative embodiment, the wireless device 512 may operate as an access point for a limited purpose of enabling the programming device 514 to establish the wireless connection 516 between the programming device 514 and the wireless device 512. After the wireless connection 516 is established, the programming module 506 may configure the wireless device 512 via the wireless connection 516.

In a particular embodiment, the programming module 506 may configure the wireless device 512 to communicate, via the access point 504, with other devices outside the network 502. To illustrate, the programming module 506 may configure the wireless device 512 by authenticating and programming the wireless device 512. For example, the programming module 506 may authenticate the wireless device 512 based on programming credentials.

In a particular embodiment, a user may obtain (e.g., download from a website) the programming credentials using the programming device 514 and make the programming credentials available to the programming module 506. In an alternative embodiment, the programming module 506 may be configured to automatically obtain (i.e., without user involvement) the programming credentials from a server, such as the server 520. For example, the programming module 506 may be configured to obtain the programming credentials from the server 520 using the communication capabilities of the programming device 514.

In yet another alternative embodiment, a user may download an application onto the programming device 514. For example, the server 520 may provide the application to the programming module 506 in the programming device 514 to enable the programming module 506 to perform the authentication and the programming of the wireless device. The programming device 514 may obtain the programming credentials upon execution of the application. To illustrate, a user may use the programming device 514 (e.g., a smart-phone) to download the application onto the smart-phone by entering proof-of-purchase information at a particular website (e.g. a website of a utility company). Alternatively, the user may provide other relevant information at a particular website to download the application. The programming device 514 may obtain the programming credentials upon execution of the downloaded application. In a particular embodiment, the programming credentials may include a device identifier, a passphrase of the wireless device, a digital certificate, or a combination thereof. In a particular embodiment, the programming module 506 may be downloaded to the programming device 514 (e.g., a smart phone) as an application. The execution of the application may automatically configure the wireless device 112 without any further involvement from a user. For example, the user may be able to download the application based on information provided at a time of purchase or when an electronic mail (email) message is received by the user.

In a particular embodiment, authenticating the wireless device 512 based on the programming credentials may unlock the wireless device 512 to enable the programming of the wireless device 512 with access credentials. For example, the wireless device 512 may be locked by a manufacturer or vendor of the wireless device 512. The wireless device 512 may be locked, for example, to prevent unauthorized programming of the wireless device 512. Unlocking the wireless device 512 by authenticating the wireless device 512 based on the programming credentials may unlock the wireless device 512 for programming. To illustrate, the programming module 506 may program the wireless device 512 with access credentials of the access point 504 of the network 502, 532 to enable the wireless device 512 to communicate, via the access point 504, with devices that are outside of the network 502, 532.

In a particular embodiment, the access credentials may include one or more of a service set identifier (SSID) of the access point 504 and a passphrase of the access point 504.

In a particular embodiment, a user may provide the access credentials to the programming module 506. In an alternative embodiment, the programming device 514 may obtain the access credentials from the server 520.

The network 532 corresponds to the network 502 after the configuration of the wireless device 512 by the programming module 506, such that the wireless device 512 is operable to communicate via the access point 504 with devices that are outside of the network 502, 532.

During operation, the programming device 514 may communicate with the wireless device 512 via a peer-to-peer wireless connection to enable the programming module 506 to configure the wireless device 512. The programming module 506 may authenticate the wireless device 512 based on the programming credentials. For example, the programming device 514 including the programming module 506 may obtain the programming credentials from execution of an application downloaded onto the programming device 514. After authenticating the wireless device 512 to unlock the wireless device 512, the programming module 506 may program the wireless device 512 with the access credentials of the access point 504. For example, the programming device 514 including the programming module 506 may obtain the access credentials from the server 520. Upon successful authentication and programming of the wireless device 512, the wireless device 512 may communicate, via the access point 504, with devices that are outside of the network 502, 532. To illustrate, the wireless device 512 may provide the server 520 with information about operation conditions of the wireless device 512. The server 520 may also control one or more operations of the wireless device 520 via the access point 504 of the network 502, 532.

By automatically configuring the wireless device 512, the wireless device 512 may communicate via the access point 504 with devices that are outside of the network 502, 532. Automatic configuration of the wireless device 512 by the programming module 506 may enable configuration of a wireless device with no user involvement, or limited user involvement in the configuration process. Using a programming device such as a smart-phone may also reduce cost of adding a new device into a network. Additionally, configuring the wireless device 512 to use an existing access point, such as the access point 504, may also reduce cost of adding a new device into an existing network. Additionally, automatic configuration by the programming module 506 enables configurations of wireless devices that may not have a data entry and/or display interface for manual configuration of the device.

Referring to FIG. 6, a particular embodiment of a method of automatically configuring the wireless device 512 to communicate via the access point 504 of the network 502 in the system 500 of FIG. 5 is disclosed and generally designated 600. FIG. 6 illustrates operation of the wireless device 512, the programming device 514 including the programming module 506, and the access point 504 of FIG. 5.

The method 600 includes obtaining programming credentials and access credentials to configure the wireless device 512 to communicate, via the access point 504, at 606. For example, the programming device 514 may obtain programming credentials upon execution of an application that is downloaded onto the programming device 514. The programming device 514 may alternatively obtain the access credentials from a server, such as the server 520 of FIG. 5.

The method 600 may include powering up the wireless device 512, at 610. For example, the wireless device 512 may power-up in response to an input from a user or at particular intervals. The method 600 may further include performing service discovery, at 612. In a particular embodiment, the wireless device 512 may perform the service discovery in response to powering up. For example, the wireless device 512 may perform service discovery to identify the programming device 514 after power up. In a particular alternative embodiment, the wireless device 512 may perform service discovery to restore communication via the access point 504.

In a particular alternative embodiment, the programming device 514 may perform service discovery to identify the wireless device 512. For example, the programming device 514 may perform the service discovery based on beacons, public action frames, a probe request message, or any combination thereof.

The method 600 includes sending a probe request by the wireless device 512 to the programming device 514 including the programming module 506, at 614. The programming device 514 may receive the first device public key from the wireless device 512 and compare the first device public key with a second device public key. In a particular embodiment, the second device public key may be a device key that is received from the server 520. If the programming device 514 determines that there is a match between the first device public key and the second device public key, the programming device 514 may send a probe response including an indication of the match. The wireless device 512 may receive the probe response from the programming module 506, at 616.

The method 600 further includes authenticating, by the programming module 506, the wireless device 512 based on programming credentials, at 618. For example, the programming module 506 may authenticate the wireless device 512 by exchanging authentication messages with the wireless device 512. Authentication of the wireless device 512 may unlock the wireless device 512. Unlocking the wireless device 512 may enable subsequent programming of the wireless device 512 with access credentials of the access point 504 of the network 502, 532 of FIG. 5.

The method 600 further includes programming of the wireless device 512 with the access credentials of the access point 504, at 620. To illustrate, the programming device 514 may receive the access credentials from the server 520 and program the wireless device 512 with the access credentials. To illustrate, the access credentials may include a service set identifier (SSID) of the access point 504 and/or a passphrase of the access point 504. In a particular embodiment, the programming module 506 may store the received access credentials for future use. After the wireless device 512 is programmed with the access credentials of the access point 504, the wireless device 512 may be configured to communicate, via the access point 504, with the server 520.

The method 600 also includes performing association of the wireless device 512 with the access point 504, at 622. After the wireless device 512 is associated with the access point 504, the wireless device 512 may communicate with the server 520 and other devices outside of the network 502, 532 of FIG. 5 via the access point 504.

In a particular embodiment, the method 600 may use an authentication framework from access-authentication protocol with programming framework from wife protected access (WPA) protocol.

Referring to FIG. 7, a block diagram of a particular embodiment of a wireless communication device 700 that may operate as one or more of a programming module, a programming device including a programming module, a single device including an access point and a programming module, and a wireless device that is adapted to be configured to communicate via an access point is disclosed.

The device 700 is operable as a programming module to configure a wireless device to communicate, via an access point of a network, with devices that are outside of the network as described with reference to the programming module 106 of FIGS. 1-4 and the programming module 506 of FIGS. 5 and 6.

The device 700 is also operable as a programming device including a programming module as described with reference to the programming device 514 of FIGS. 5 and 6. Additionally, the device 700 may operate as a single device including an access point and a programming module as described with reference to the single device 114 of FIG. 1 and as indicated with respect to the description of FIG. 2. Further, the device 700 is also operable as a wireless device that is adapted to be configured to communicate via an access point as described with reference to the wireless device 112 of FIGS. 1-4 and the wireless device 512 of FIGS. 5 and 6.

The device 700 includes a processor, such as a processor 710, coupled to a memory 732. The memory 732 may be a non-transitory computer readable storage medium that stores data (e.g., programming credentials 792 that are used to authenticate a wireless device to unlock the wireless device to enable programming the unlocked device with access credentials of an access point), instructions (e.g., instructions 790 to automatically configure a wireless device), or both. In a particular embodiment, the memory 732 may include instructions 780 that may be executable by the processor 710 to cause the processor 710 to perform one or more functions of the device 700. For example, the instructions 780 may include user applications, an operating system, or other executable instructions, or a combination thereof. The instructions 780 may be executable by the processor 710 to cause the processor 710 to perform at least a portion of the functionality described with respect to FIGS. 1-6. For example, when the device 700 is operating as a wireless device, such as the wireless device 112 of FIGS. 1-4 or the wireless device 512 of FIGS. 5 and 6, the instructions 780 may be executable by the processor 710 to cause the processor 710 to initiate sending a programming request message to a programming module, such as the programming module 106 of FIGS. 1-4 or the programming device 514 of FIGS. 5 and 6.

The device 700 may include a transceiver 750 for sending and receiving signals and/or messages. For example, the device 700 may function as a transmitter when the device 700 transmits one more authentication messages (e.g., the probe response message 616 of FIG. 6), or any other messages to a wireless device (e.g., the wireless device 512 of FIG. 6). As another example, the device 700 may function as a receiver when the device 700 receives the probe request message 614 of FIG. 6. In a particular alternative embodiment, the processor 710 may include logic 712 to automatically configure a wireless device, such as the wireless device 512 of FIG. 6, instead of or in addition to the instructions 790 to automatically configure a wireless device. For example, the logic 712 may be implemented in hardware within the processor 710. Alternatively, the logic 712 may be implemented in hardware outside of the processor 710.

The device 700 may also include a wired interface 746. To illustrate, when the device 700 is operating as a programming module that may configure a wireless device to communicate with other devices via an access point, the device 700 may be coupled to the access point via the wired interface. For example, when the device 700 is operating as the programming module 106 (shown in FIG. 1), the device 600 may be coupled to the access point 104 via the wired interface 746. The device 700 may send and receive messages to/from a wireless device (e.g., the wireless device 112 of FIGS. 1-4) via an access point, such as the access point 104 of FIGS. 1, 3, and 4.

FIG. 7 also shows a display controller 726 that may be coupled to the processor 710 and to a display 728. A coder/decoder (CODEC) 734 (e.g., an audio and/or voice CODEC) may be coupled to the processor 710. A speaker 736 and a microphone 738 may be coupled to the CODEC 734. FIG. 7 also indicates that a wireless controller 740 may be coupled to the processor 710 and to the transceiver 750 that is coupled to a wireless antenna 742. In a particular embodiment, the processor 710, the display controller 726, the memory 732, the CODEC 734, the wireless controller 740, and the transceiver 750 are included in a system-in-package or system-on-chip device 722.

In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antenna 742, and the power supply 744 are external to the system-on-chip device 722. However, each of the display 728, the input device 730, the speaker 736, the microphone 738, the wireless antenna 742, and the power supply 744 can be coupled to a component of the system-on-chip device 722, such as an interface or a controller.

It should be noted that although FIG. 7 depicts a wireless communications device, the processor 710 and the memory 732 may be integrated into other devices, such as a multimedia player, an entertainment unit, a navigation device, a personal digital assistant (PDA), a fixed location data unit, or a computer (e.g., a tablet computer, a laptop computer, a desktop computer, etc), a media device, a router or gateway device, or another device configured to wirelessly communicate data.

In conjunction with the described embodiments, an apparatus is disclosed that includes means for receiving programming credentials. For example, the means for receiving programming credentials may include the programming module 106 of FIGS. 1-4 and the programming device 514 including the programming module 506 of FIGS. 5 and 6, the device 700 of FIG. 7 or a portion thereof, one or more other devices configured to receive programming credentials, or any combination thereof.

The apparatus also includes means for authenticating the wireless device based on the programming credentials. For example, the means for authenticating may include programming module 106 of FIGS. 1-4 and the programming device 514 including the programming module 506 of FIGS. 5 and 6, the device 700 of FIG. 7 or a portion thereof, one or more other devices configured to authenticate the wireless device, or any combination thereof.

The apparatus also includes means for programming the wireless device with access credentials of an access point of a network. For example, the means for programming may include the programming module 106 of FIGS. 1-4 and the programming device 514 including the programming module 506 of FIGS. 5 and 6, the device 700 of FIG. 7 or a portion thereof, one or more other devices configured to program a wireless device with access credentials, or any combination thereof.

In conjunction with the described embodiments, an apparatus is disclosed that includes means for performing service discovery. For example, the means for performing service discovery may include the programming module 106 of FIGS. 1-4 and the programming device 514 including the programming module 506 of FIGS. 5 and 6, the wireless device 112 of FIGS. 1-4, the wireless device 512 of FIGS. 5 and 6, the device 700 of FIG. 7 or a portion thereof, one or more other devices configured to perform service discovery, or any combination thereof.

The apparatus also includes means for sending to a programming module a probe request. For example, the means for sending to a programming module a probe request may include the programming module 106 of FIGS. 1-4, the programming device 514 including the programming module 506 of FIGS. 5 and 6, the device 700 of FIG. 7 or a portion thereof, one or more other devices configured to send a probe request or any combination thereof.

The apparatus also includes means for receiving a probe response including an indication of a match between the first device public key and a second device public key. For example, the means for sending to a programming module a probe request may include the wireless device 112 of FIGS. 1-4, the wireless device 512 of FIGS. 5 and 6, the device 700 of FIG. 7 or a portion thereof, one or more other devices configured to receive a probe response, or any combination thereof.

In conjunction with the described embodiments, an apparatus is disclosed that includes means for receiving a programming request message including a request for programming of a wireless device. For example, the means for receiving may include the programming module 106 of FIGS. 1-4 and the programming device 514 including the programming module 506 of FIGS. 5 and 6, the device 700 of FIG. 7 or a portion thereof, one or more other devices configured to receive a programming request, or any combination thereof.

The apparatus also includes means for sending to the wireless device one or more authentication messages including programming credentials. For example, the means for sending one or more authentication messages may include the programming module 106 of FIGS. 1-4, the programming device 514 including the programming module 506 of FIGS. 5 and 6, the device 700 of FIG. 7 or a portion thereof, one or more other devices configured to send one or more authentication messages, or any combination thereof.

The apparatus also includes means for sending to the wireless device one or more programming messages including access credentials of an access point of a network. For example, the means for sending one or more programming messages may include the programming module 106 of FIGS. 1-4, the programming device 514 including the programming module 506 of FIGS. 5 and 6, the device 700 of FIG. 7 or a portion thereof, one or more other devices configured to send one or more programming messages or any combination thereof.

In conjunction with the described embodiments, an apparatus is disclosed that includes means for performing service discovery to identify the wireless device. For example, the means for performing service discovery may include the programming module 106 of FIGS. 1-4 and the programming device 514 including the programming module 506 of FIGS.

5 and 6, the device 700 of FIG. 7 or a portion thereof, one or more other devices configured to perform service discovery, or any combination thereof.

The apparatus also includes means for establishing a wireless connection between a programming device including a programming module and the wireless device. For example, the means for establishing a wireless connection may include the programming device 514 including the programming module 506 of FIGS. 5 and 6, the device 700 of FIG. 7 or a portion thereof, one or more other devices configured to establish a wireless connection, or any combination thereof.

The apparatus also includes means for authenticating the wireless device based on programming credentials. For example, the means for authenticating may include the programming module 106 of FIGS. 1-4, the programming device 514 including the programming module 506 of FIGS. 5 and 6, the device 700 of FIG. 7 or a portion thereof, one or more other devices configured to authenticate or any combination thereof.

The apparatus also includes means for programming the wireless device with access credentials of an access point of a network. For example, the means for programming may include the programming module 106 of FIGS. 1-4, the programming device 514 including the programming module 506 of FIGS. 5 and 6, the device 700 of FIG. 7 or a portion thereof, one or more other devices configured to programming the wireless device or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method of automatically configuring a wireless device, the method comprising:
    receiving programming credentials from a server at a programming module;
    authenticating the wireless device based on the programming credentials;
    sending an authentication success message from the programming module to the wireless device after authenticating the wireless device, wherein the wireless device unlocks to enable programming of access credentials of an access point after receiving the authentication success message; and
    sending a programming message from the programming module to the wireless device after sending the authentication success message, wherein the programming message includes the access credentials of the access point.

2. The method of claim 1, wherein the wireless device locks to disable programming of the wireless device with access credentials of another access point after receiving the programming message from the programming module.

3. The method of claim 2, wherein the programming module authenticates the wireless device by exchanging authentication messages with the wireless device via the access point, and wherein at least one of the authentication messages is sent from the programming module and includes the programming credentials.

4. The method of claim 3, wherein after receiving the programming message from the programming module the wireless device completes local association with the access point.

5. The method of claim 3, wherein:
    unlocking the wireless device comprises unlocking a non volatile memory of the wireless device;
    the access credentials are programmed into the non volatile memory of the wireless device; and
    the wireless device locks the non volatile memory after the access credentials are programmed into the wireless device.

6. The method of claim 1, wherein after sending the programming message from the programming module the wireless device completes local association with the access point.

7. The method of claim 3, wherein the programming credentials include information stored within a subscriber identity module (SIM).

8. The method of claim 3, wherein the programming credentials include a shared key, a digital certificate or a username and a password, and wherein the access credentials include a service set identifier (SSID) of the access point and a passphrase of the access point.

9. The method of claim 8, wherein the programming module is configured to receive the access credentials from the access point.

10. The method of claim 8, wherein the access credentials are input into the programming module.

11. The method of claim 2, wherein the programming module and the access point are integrated into a single device that is configured to perform access point functions and programming module functions.

12. The method of claim 1, further comprising establishing a secure connection between the programming module and the access point prior to authenticating the wireless device.

13. The method of claim 1, further comprising sending an invitation by the programming module to the wireless device to initiate configuration of the wireless device.

14. The method of claim 13, wherein the invitation is sent by the programming module using beacon frames, generic advertisement service (GAS) frames, or probe response messages.

15. The method of claim 13, further comprising discovering a network by the wireless device before configuration of the wireless device is initiated by the programming module.

16. The method of claim 15, wherein the wireless device is adapted to use a probe request message or an access network query protocol (ANQP) message to discover the network.

17. The method of claim 13, further comprising performing service discovery to detect a service discovery identifier communicated by an internet protocol (IP) packet carried over one or more beacon frames, generic advertisement service (GAS) frames, or access network query protocol (ANQP) messages.

18. The method of claim 13, further comprising sending a re-invitation by the programming module to the wireless device to re-initiate the configuration of the wireless device.

19. The method of claim 1, further comprising performing service discovery by the programming module to identify one or more available wireless devices to configure for communication, via the access point, with devices outside of a network.

20. The method of claim 1, wherein the access point and the wireless device are compliant with one or more Institute of Electrical and Electronic Engineers (IEEE) 802.11 standards.

21. An apparatus for automatically configuring a wireless device, the apparatus comprising:
a processor; and
a memory storing instructions executable by the processor to:
authenticate the wireless device based on received programming credentials, wherein the programming credentials are received from a server;
send an authentication success message to the wireless device after authenticating the wireless device, wherein the wireless device is caused to unlock and enable programming of access credentials of an access point after receiving the authentication success message; and
send a programming message to the wireless device after sending the authentication success message, wherein the programming message includes the access credentials of the access point.

22. The apparatus of claim 21, wherein the wireless device locks to disable programming of the wireless device with access credentials of another access point after receiving the programming message.

23. An apparatus for automatically configuring a wireless device, the apparatus comprising:
means for receiving programming credentials from a server;
means for authenticating the wireless device based on the programming credentials;
means for sending an authentication success message to the wireless device after authenticating the wireless device, wherein the wireless device unlocks to enable programming of access credentials of an access point after receiving the authentication success message; and
means for sending a programming message to the wireless device after sending the authentication success message, wherein the programming message includes the access credentials of the access point.

24. The apparatus of claim 23, wherein the wireless device locks to disable programming of the wireless device with access credentials of another access point after receiving the programming message.

25. A non-transitory computer-readable medium including program code that, when executed by a processor, causes the processor to:
authenticate a wireless device based on received programming credentials, wherein the programming credentials are received from a server;
send an authentication success message to the wireless device after authenticating the wireless device, wherein the wireless device unlocks to enable programming of access credentials of an access point after receiving the authentication success message; and
send a programming message to the wireless device after sending the authentication success message, wherein the programming message includes the access credentials of the access point.

26. The non-transitory computer-readable medium of claim 25, wherein the wireless device locks to disable programming of the wireless device with access credentials of another access point after receiving the programming message.

27. A method comprising:
receiving, at a server, device information of a wireless device and subscription information of a subscriber; and
providing programming credentials to a programming module based on both the device information and the subscription information, wherein the programming credentials are used to authenticate the wireless device, wherein an authentication success message is sent from the programming module to the wireless device after authenticating the wireless device, wherein the wireless device unlocks to enable programming of access credentials of an access point automatically after receiving the authentication success message, wherein a programming message is sent from the programming module to the wireless device automatically after sending the authentication success message, and wherein the programming message includes the access credentials of the access point.

28. The method of claim 27, wherein the server receives the device information and the subscription information from a transaction terminal.

29. The method of claim 27, further comprising providing an application to the programming module to enable the programming module to send the authentication success message and the programming message to the wireless device.

30. The method of claim 29, further comprising controlling an operation of the wireless device via the access point after the programming of the wireless device with the access credentials of the access point.

31. The method of claim 27, wherein the server is a smart energy server.

32. The method of claim 31, wherein the smart energy server supports a ZigBee Smart Energy standard.

33. An apparatus comprising:
a processor; and
a memory storing instructions executable by the processor to:
detect receipt of device information of a wireless device and subscription information of a subscriber; and provide programming credentials to a programming module based on both the device information and the subscription information, wherein the programming credentials are used to authenticate the wireless device, wherein an authentication success message is sent from the programming module to the wireless device after authenticating the wireless device, wherein the wireless device unlocks to enable programming of access credentials of an access point automatically after receiving the authentication success message, wherein a programming message is sent from the programming module to the wireless device automatically after sending the authentication success message, and wherein the programming message includes the access credentials of the access point.

34. A method of automatically configuring a wireless device, the method comprising:
receiving, at a programming module, a programming request message including a request for programming of the wireless device;
sending to the wireless device one or more authentication messages including programming credentials;
sending an authentication success message from the programming module to the wireless device after authenticating the wireless device, wherein the wireless device unlocks to enable programming of access credentials of an access point after receiving the authentication success message; and
sending a programming message from the programming module to the wireless device after sending the authentication success message, wherein the programming message includes the access credentials of the access point.

35. The method of claim 34, wherein the programming module is configured to:
perform authentication of the wireless device based on the programming credentials; and
program the wireless device with the access credentials of the access point, the wireless device being locked following the programming from being programmed with access credentials of another access point.

36. The method of claim 35, wherein after receiving the programming message from the programming module the wireless device completes local association with the access point.

37. The method of claim 36, wherein the programming request message and the programming message are Authentication Authorization and Accounting (AAA) protocol messages.

38. The method of claim 36, wherein the programming message is sent within one or more data packets.

39. The method of claim 35, wherein the programming request message further includes device specific information of the wireless device.

40. The method of claim 34, further comprising sending to the wireless device a service discovery message including device programming capability information.

41. The method of claim 34, wherein the one or more authentication messages and the programming message are sent to the wireless device via the access point and wherein the programming request message is received from the wireless device via the access point.

42. The method of claim 34, wherein the one or more authentication messages and the programming message are sent to the wireless device via a direct wireless connection between the programming module and the wireless device and wherein the programming request message is received from the wireless device via the direct wireless connection between the programming module and the wireless device.

43. An apparatus for automatically configuring a wireless device, the apparatus comprising:
a processor; and
a memory storing instructions executable by the processor to:
detect receipt of a programming request message including a request for programming of the wireless device;
initiate sending to the wireless device of one or more authentication messages including programming credentials;
initiate sending an authentication success message to the wireless device after authenticating the wireless device, wherein the wireless device unlocks to enable programming of access credentials of an access point after receiving the authentication success message; and
initiate sending a programming message to the wireless device after sending the authentication success message, wherein the programming message includes the access credentials of the access point.

44. An apparatus for automatically configuring a wireless device, the apparatus comprising:
means for receiving a programming request message including a request for programming of the wireless device;
means for sending to the wireless device one or more authentication messages including programming credentials;
means for sending an authentication success message to the wireless device after authenticating the wireless device, wherein the wireless device unlocks to enable programming of access credentials of an access point after receiving the authentication success message; and
means for sending a programming message to the wireless device after sending the authentication success message, wherein the programming message includes the access credentials of the access point.

45. A non-transitory computer-readable medium including program code that, when executed by a processor, causes the processor to:
detect receipt of a programming request message including a request for programming of a wireless device;
initiate sending to the wireless device of one or more authentication messages including programming credentials;
send an authentication success message to the wireless device after authenticating the wireless device, wherein the wireless device unlocks to enable programming of access credentials of an access point automatically after receiving the authentication success message; and
sending a programming message to the wireless device automatically after sending the authentication success message, wherein the programming message includes the access credentials of the access point.

46. A method of automatically configuring a wireless device, the method comprising:
receiving, at the wireless device, a service discovery message including device programming capability information;
sending to a programming module a programming request message including a request for programming of the wireless device;
receiving, at the wireless device, one or more authentication messages including programming credentials;

detect receipt of an authentication success message from the programming module after authenticating the wireless device, wherein the wireless device unlocks to enable programming of access credentials of an access point automatically after detecting receipt of the authentication success message; and detect receipt of a programming message sent automatically from the programming module after the authentication success message, wherein the programming message includes the access credentials of the access point.

47. The method of claim 46, wherein the wireless device locks to disable programming of the wireless device with access credentials of another access point after receiving the programming message from the programming module.

48. The method of claim 47,
wherein after receiving the programming message from the programming module, the wireless device completes local association with the access point.

49. The method of claim 46, wherein the programming request message is sent within at least one authentication frame.

50. The method of claim 46, wherein the one or more programming messages are received within one or more authentication frames.

51. The method of claim 46, wherein the one or more programming messages are received within one or more data frames.

52. The method of claim 46, wherein the service discovery message is received using a beacon, a public action frame, a probe request message, or any combination thereof.

53. A wireless device comprising:
a processor; and
a memory storing instructions executable by the processor to:
detect receipt of a service discovery message including device programming capability information;
initiate sending to a programming module of a programming request message including a request for programming;
detect receipt of one or more authentication messages including programming credentials;
detect receipt of an authentication success message from the programming module;
unlock to enable programming of access credentials of an access point automatically after detecting receipt of the authentication success message; and
detect receipt of a programming message sent automatically from the programming module after the authentication success message, wherein the programming message includes the access credentials of the access point.

54. A method of automatically configuring a wireless device, the method comprising:
performing service discovery by a programming device to identify the wireless device, wherein the programming device includes a programming module;
establishing a wireless connection by the programming device between the programming device and the wireless device;
authenticating the wireless device based on programming credentials;
sending an authentication success message from the programming device to the wireless device after authenticating the wireless device, wherein the wireless device unlocks to enable programming of access credentials of an access point after receiving the authentication success message; and sending a programming message from the programming device to the wireless device after sending the authentication success message, wherein the programming message includes the access credentials of the access point.

55. The method of claim 54, wherein the wireless device locks to disable programming of the wireless device with access credentials of another access point after receiving the programming message from the programming module.

56. The method of claim 54, wherein the wireless device is configured to operate as an access point to enable the programming module to establish the wireless connection between the programming device and the wireless device.

57. The method of claim 54, wherein the wireless connection is a peer-to-peer wireless connection, and wherein after receiving the programming message from the programming device, the wireless device completes local association with the access point.

58. The method of claim 57, wherein the programming device is configured to obtain the programming credentials.

59. The method of claim 58, wherein the programming device is configured to obtain the programming credentials based on an application that is executable to obtain the programming credentials.

60. The method of claim 54, wherein the programming credentials include a device identifier, a passphrase of the wireless device, a digital certificate, or a combination thereof.

61. The method of claim 60, wherein the access credentials include one or more of a service set identifier (SSID) of the access point and a passphrase of the access point.

62. The method of claim 54, wherein the wireless device is a home appliance, a meter configured to take measurements, a mobile device, a camera, a multimedia player, an entertainment unit, a navigation device, or any combination thereof.

63. An apparatus for automatically configuring a wireless device, the apparatus comprising:
a processor; and
a memory storing instructions executable by the processor to:
perform service discovery to identify the wireless device;
establish a wireless connection with the wireless device;
authenticate the wireless device based on programming credentials;
send an authentication success message to the wireless device after authenticating the wireless device, wherein the wireless device is caused to unlock and enable programming of access credentials of an access point after receiving the authentication success message; and
send a programming message to the wireless device after sending the authentication success message, wherein the programming message includes the access credentials of the access point.

64. An apparatus for automatically configuring a wireless device, the apparatus comprising:
means for performing service discovery to identify the wireless device;
means for establishing a wireless connection between a programming device including a programming module and the wireless device;
means for authenticating the wireless device based on programming credentials;
means for sending an authentication success message from the programming device to the wireless device after authenticating the wireless device, wherein the wireless device is caused to unlock and enable programming of access credentials of an access point after receiving the authentication success message; and means for sending a programming message from the programming device to the wireless device after sending the authentication success message, wherein the programming message includes the access credentials of the access point.

65. A non-transitory computer-readable medium including program code that, when executed by a processor, causes the processor to:

perform service discovery to identify a wireless device;

establish a wireless connection with the wireless device;

authenticate the wireless device based on programming credentials;

send an authentication success message to the wireless device after authenticating the wireless device, wherein the wireless device is caused to unlock and enable programming of access credentials of an access point automatically after receiving the authentication success message; and send a programming message to the wireless device automatically after sending the authentication success message, wherein the programming message includes the access credentials of the access point.

\* \* \* \* \*